Figure 1:
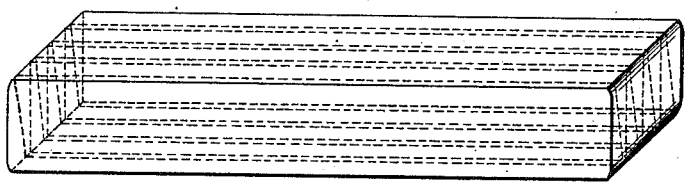

No. 688,223. Patented Dec. 3, 1901.
C. BENSINGER.
PROCESS OF MANUFACTURING COMBS FROM CELLULOID.
(Application filed Oct. 14, 1901.)
(No Model.)

Attest:
J. A. Graves.
T. F. Kehoe.

Inventor:
Carl Bensinger
by
Philipp Sawyer Rice & Kennedy
Attys.

UNITED STATES PATENT OFFICE.

CARL BENSINGER, OF MANNHEIM, GERMANY.

PROCESS OF MANUFACTURING COMBS FROM CELLULOID.

SPECIFICATION forming part of Letters Patent No. 688,223, dated December 3, 1901.

Original application filed March 19, 1901, Serial No. 51,876. Divided and this application filed October 14, 1901. Serial No. 78,518. (No specimens.)

*To all whom it may concern:*

Be it known that I, CARL BENSINGER, a subject of the Grand Duke of Baden, residing at M² No. 16, Mannheim, in the Grand Duchy of Baden, German Empire, have invented certain new and useful Improvements in the Processes of Manufacturing Combs from Celluloid; and I do hereby declare that the following is a full, clear, and exact description of my invention, which will enable others skilled in the art to which it appertains to make and use the same This invention relates to the making of celluloid combs.

It has been the usual practice in making the various kinds of celluloid combs heretofore to cut large sheets of celluloid into strips of a size approximating the size of the combs which it is desired to make, next to remove a portion of the celluloid from each side of such strip near the edge which it is proposed shall receive the teeth of the comb in such a way that the cross-section of such strip will have the desired form for a comb—that is to say, it will be thicker at the back than at the front edge—and then to form the teeth in the blank thus produced by sawing or cutting. In the above method the removal of the celluloid from the sides of the strips involves a considerable loss in material, labor, and time. Many attempts have been made heretofore for the purpose of avoiding the loss, such attempts relating to the production of the comb-blanks by pressing the celluloid in dies, after which the comb-blanks were completed by sawing or cutting teeth in them. In carrying out these attempts two general methods were employed, viz: First, the material employed was either fresh or undried celluloid as it came from the mixing-roller or block-cutting machine, or, second, said material consisted of plates of dried celluloid made plastic by heat. Both these methods have been unsuccessful for the following reasons: In the first method the blanks produced by pressing become porous, owing to the fact that the solvent in the fresh material volatilizes from said material and condenses on the sides of the molds; also, the blanks thus obtained must of necessity be subjected to a drying process, which results in the deformation or warping of the comb-blanks, whereby they are rendered worthless. In the second method as the plates of dried celluloid, made plastic by heat, were of a substantially uniform thickness, while the comb-blanks to be obtained were of varying thickness, a considerable displacement of the material by the pressure applied took place, thus developing large internal strains in the comb-blanks, whereby it resulted that when the final step of cutting the teeth in the blank was undertaken the blank would break. Hence in all these old pressing processes a certain molecular strain was produced which spoiled the blanks.

It is the object of my invention to avoid the disadvantages as before pointed out of the methods heretofore practiced and known for producing celluloid combs.

In carrying out my process I form my comb-blanks from a block of celluloid by dividing the block in planes a distance apart corresponding to the thickness of the comb-blank and which are successively at such an angle to each other that the blanks thus cut from the block of celluloid will have the desired cross-section, and the blanks thus produced are then heated and pressed in a suitable die to form the teeth in the comb and complete the general shaping of the comb. The comb is thus practically completed, and after cleaning and finishing it is ready for the market. The comb-blanks are preferably formed from the block of celluloid by sawing through the block with planes of division so spaced and at such an angle to each other that each comb-blank thus produced has the desired cross-section.

It will be seen that by my process comb-blanks are obtained in the desired shape without loss of material or labor and without altering the density of any part of the comb-blank. The block of celluloid can readily be produced of substantially uniform density, and the comb-blanks may thus be formed without the production of internal strains in the blank. As in producing combs in accordance with my improved process the material is not subjected to any considerable molecular strain either during the forming of the blanks or during the subsequent operation of pressing to form the teeth, combs produced in accordance with my process are strong and durable.

My process will be fully understood from the above description when read in connection with the accompanying drawings, in which—

Figure 2:
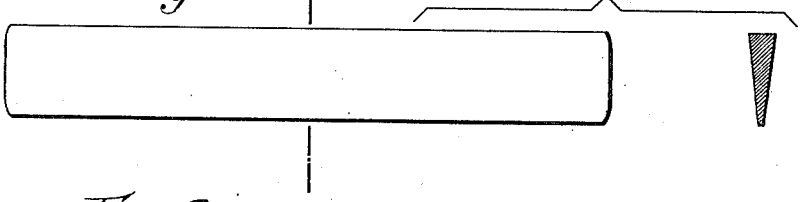
Figure 3:
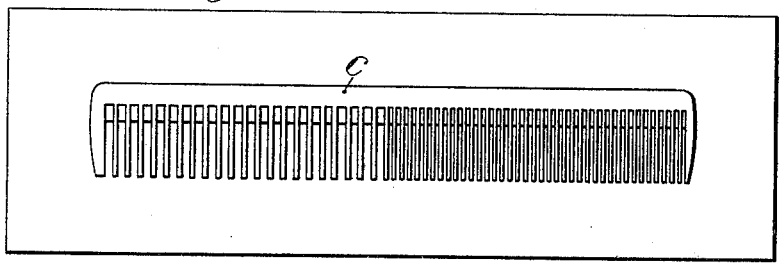
Figure 4:
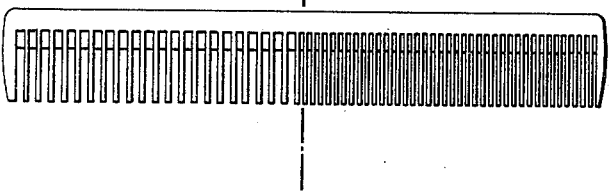
Figure 5:

Figure 1 shows as an example of one mode of cutting the blanks a perspective view of a block of celluloid having a thickness equal to the width of the comb to be produced and having the planes in which it is divided to form the comb-blanks indicated by dotted lines. Fig. 2 shows in side elevation and in transverse section a comb-blank produced in accordance with my invention. Fig. 3 illustrates one of the two parts of a mold in which the blank is pressed, the matrix or hollow corresponding to the shape of the comb being indicated at c. Fig. 4 is a side elevation of a completed comb; and Fig. 5 is a transverse section of the same, the teeth being provided with oblique surfaces, as indicated at e.

What I claim, and desire to secure by Letters Patent of the United States, is—

1. The process of making celluloid combs which consists in sawing the comb-blanks from a block of celluloid, adjacent saw-cuts being in planes at such an angle to each other as to form blanks of the desired shape, and then subjecting the blanks to heat and compression to form the teeth and to substantially complete the shape of the comb, substantially as described.

2. The process of making celluloid combs, which consists in forming the blanks from a block of celluloid by dividing the block in planes successively at such an angle to each other as to form blanks of the desired shape, and then subjecting the blanks to heat and compression to form the teeth and to substantially complete the shape of the comb, substantially as described.

In testimony that I claim the foregoing as my invention I have signed my name in presence of two subscribing witnesses.

CARL BENSINGER.

Witnesses:
H. E. KEIPP,
T. TUNG.